United States Patent [19]
Nishikawa et al.

[11] Patent Number: 6,125,045
[45] Date of Patent: Sep. 26, 2000

[54] POWER CONVERTER HAVING FIRST AND SECOND POWER CONVERSION UNITS WITH THYRISTORS

[75] Inventors: Hiroyuki Nishikawa, Higashimurayama; Kihei Nakajima, Yokohama; Shoichi Irokawa, Koshigaya; Hiroshi Uchino, Hachioji, all of Japan

[73] Assignee: Kabushiki Kaisha Toshiba, Kawasaki, Japan

[21] Appl. No.: 09/379,916

[22] Filed: Aug. 24, 1999

[30] Foreign Application Priority Data

Aug. 24, 1998 [JP] Japan .................................. 10-237208
Feb. 17, 1999 [JP] Japan .................................. 11-038571

[51] Int. Cl.⁷ .................................................. H02M 5/45
[52] U.S. Cl. ........................................................ 363/37
[58] Field of Search ................................. 363/34, 35, 36, 363/37

[56] References Cited

U.S. PATENT DOCUMENTS 4,555,750  11/1985  Masumura et al. ........................ 363/37
4,736,148  4/1988  Hirata ........................................ 363/37
5,123,746  6/1992  Okado ....................................... 363/37
5,287,260  2/1994  Uchino ...................................... 363/58

FOREIGN PATENT DOCUMENTS 5-115178  5/1993  Japan .

OTHER PUBLICATIONS

Per–Erik Björklund et al., "HVDC Transmission" ABB Review 2, *Capacitor commutated converters for HVDC systems*, pp. 25–33, Feb. (1997).

*Primary Examiner*—Shawn Riley
*Attorney, Agent, or Firm*—Foley & Lardner

[57] ABSTRACT

A power converter includes first and second power conversion units that are connected to each other by a d.c. reactor. The first power conversion unit is a converter in which arms consisting of thyristors are connected in a bridge configuration. The second power conversion unit is an inverter in which arms each of a series combination of a thyristor and a self-excited switch unit having a GTO for producing a commutation voltage for the thyristor are connected in a bridge configuration.

14 Claims, 13 Drawing Sheets

POWER CONVERTER HAVING FIRST AND SECOND POWER CONVERSION UNITS WITH THYRISTORS

BACKGROUND OF THE INVENTION

The present invention relates to a power converter which converts alternating current into direct current and/or vice versa and more specifically to a power converter suitable for use in commutatorless motor systems, power frequency conversion systems, and conversion systems for d.c. power transmission.

An example of a conventional power converter will be described with reference to FIG. 1. As shown in FIG. 1, the power converter comprises a converter 3 which converts alternating current into direct current, an inverter 4 which converts direct current into alternating current, a direct-current reactor 5 connected between the converter 3 and the inverter 4 which smoothes d.c. current that flows from the converter to the inverter.

The power converter further comprises a converter control circuit 85 which controls output current of the converter 3 with reference to the phase of a power source 1 and an inverter control circuit 86 which controls the output frequency of the inverter 4 on the basis of the phase of internal induced voltage of a synchronous motor 6.

The converter 3 is formed mainly from thyristors 7 to 18, which constitute arms connected in a bridge configuration.

The inverter 4 is also formed mainly from thyristors 87 to 92 and 93 to 98, which constitute arms connected in a bridge configuration.

The converter 3 and the inverter 4 are power converters of so-called separately excited current type which convert d.c. current smoothed by the d.c. reactor 5 into a.c. current by commutation based on the voltage of the power source 1 or the synchronous motor 6.

Each of the arms of the converter 3 and the inverter 4 comprises a number of series connected thyristors. For the purpose of simplifying description, each arm is described herein as comprising two devices connected in series.

The above arrangement is known as a so-called commutatorless motor system which controls the output current of the converter 3 by the converter control circuit 85 with reference to the phase of the power source 1 and controls the output frequency of the inverter 4 by the inverter control circuit 86 in accordance with the phase of internal induced voltage of the synchronous motor 6.

Next, the operation of the power converter of FIG. 1 will be described with reference to FIG. 2, in which VDC stands for d.c. output voltage of the converter 3, ID stands for current flowing into a d.c. circuit, VDI stands for d.c. input voltage to the inverter 4, IU stands for current supplied from the U phase of the inverter 4 to the U phase of the synchronous motor 6, and IV stands for current supplied from the V phase of the inverter 4 to the V phase of the synchronous motor 6.

In the W phase of the inverter 4 there flows current that is delayed in phase by 120° with respect to IV. VUV is UV line voltage in the inverter 4. The VW line voltage and the WU line voltage in the inverter 4 are delayed in phase by 120° and 240°, respectively, with respect to VUV but have similar waveforms.

Here, the commutation process from U phase to V phase in the inverter 4 will be explained by way of example. First, at time just short of t1, the U-phase thyristors 93 and 87 and the Z-phase thyristors 92 and 98 in the inverter 4 are turned ON and thus current flows from the U phase of the inverter 4 through the U and V phases of the synchronous motor 6 into the Z phase of the inverter 4. When, at time t1, the V-phase thyristors 94 and 88 are turned ON, the UV line voltage VUV is shorted by the U-phase thyristors 93 and 87 and the V-phase thyristors 94 and 88 and falls to zero.

At this point, commutation voltage indicated by A due to UV leakage inductance in the synchronous motor 6 is added to the UV line voltage VUV, decreasing the U-phase current IU and increasing the V-phase current IV. Thus, commutation is achieved.

At time t2, the U-phase current IU falls to zero, completing commutation. TQ is torque generated by the synchronous motor 6 and is in proportion to active power injected for the internal induced voltage of the synchronous motor 6. RPW is reactive power injected for the internal induced voltage of the synchronous motor 6.

FIG. 3 shows a circuit diagram illustrating another example of a conventional power converter. In this figure, like reference numerals are used to denote corresponding parts to those in FIG. 1.

In FIG. 3, the a.c. side of the converter 3 is liked with a first power supply 99 through a first transformer 100 to convert alternating current into direct current or vice versa.

The a.c. side of the inverter 4 is liked with a second power supply 101 through a second transformer 102 to convert direct current into alternating current or vice versa.

Leading capacitors 103 are associated with the first power supply 99. Likewise, leading capacitors 104 are associated with the second power supply 101.

In FIG. 3, the converter control circuit and the inverter control circuit are omitted for simplicity.

The above arrangement is known as a frequency conversion system for power system that interchanges electricity between power supply systems different in frequency or a conversion system for d.c. power transmission which converts a.c. power into high d.c. voltage for transmission to a distant place and reconverts the transmitted d.c. voltage into a.c. power.

The operation of the power converter of FIG. 3 will be explained with reference to FIG. 4, which is a waveform diagram for use in explanation of the operation of the converter 3 in FIG. 3. The operation of the inverter 4 remains unchanged from that of the converter 3 and thus the description thereof is omitted herein.

In FIG. 4, p is active power of the converter 3, while Q is reactive power. IV is current supplied from the U phase of the first transformer 100 to the U phase of the converter 3. IU is current supplied from the V phase of the first transformer 100 to the V phase of the converter 3.

In the W phase of the converter 3 there flows current that is delayed in phase by 120° with respect to IV. VUV is UV line voltage in the converter 3. The VW line voltage and the WU line voltage in the converter 3 are delayed in phase by 120° and 240°, respectively, with respect to VUV but have similar waveforms.

Here, the commutation process from U phase to V phase in the converter 3 will be explained by way of example.

At time just short of t1, the U-phase thyristors 7 and 10 and the Z-phase thyristors 15 and 18 in the converter 3 are turned ON, so that current flows from the Z phase of the converter 3 through the W and U phases of the first transformer 100 into the U phase of the converter 3. At time t1, a firing pulse is applied to the V-phase thyristors 8 and 11 of the converter 3.

At this point, since the UV line voltage VUV of the first transformer 100 is negative, a forward voltage equal to VUV is applied across the series connection of V-phase thyristors 8 and 11, turning them ON. Thus, the UV line voltage VUV is shorted by the U-phase thyristors 7 and 10 and the V-phase thyristors 8 and 11 and falls to zero.

At this point, a commutation voltage due to leakage inductance of the first transformer 100 is added to the UV line voltage VUV, decreasing the U-phase current IV and increasing the V-phase current IU. Thus, commutation is performed.

At time t2, the U-phase current IU falls to zero, completing commutation. Immediately after time t2, the UV line voltage VUV indicated at A is applied to the U-phase thyristors 7 and 10 ("B").

In the conventional power converters described above, each arm in the converter 3 and the inverter 4 is composed of thyristors. The thyristors, having features that forward voltage in the on state is low enough to allow high current to flow through, switching loss is low, and so on, allow high-efficiency, high-voltage, large-capacity converters to be produced in small size and at low cost. In addition, the thyristors are little subjected to stress at switching time and are therefore very highly reliable.

However, the thyristors have not self-extinguishing capability; therefore, commutation has to depend on a.c. voltage.

That is, as shown in FIG. 2, commutation from U phase to V phase is performed only while the UV line voltage VUV is positive. In the commutatorless motor driving system as shown in FIG. 1, therefore, the torque TQ generated by the synchronous motor 6 contains large ripple components, which may cause vibrations and noise.

In the power frequency conversion system or the d.c. power transmission conversion system as shown in FIG. 3, commutation from U phase to V phase is performed only while the UV line voltage VUV is negative. The thyristors have a turn-off time, during which a reverse voltage has to be applied; otherwise, reignition occurs (see "B" in FIG. 4).

For this reason, commutation must be started turn-off time+commutation time earlier than the time at which the UV line voltage VUV changes from negative to positive (180°) (in general, the margin-of-commutation angle is 30°).

Thus, lagging reactive power is generated as indicated at Q in FIG. 4, which needs the leading capacitors 103 and 104 of large capacity.

Furthermore, the converter 3 and the inverter 4 are operated under poor power factor conditions, providing low utilization of the thyristors.

BRIEF SUMMARY OF THE INVENTION

It is an object of the present invention to provide a power converter which can reduce torque ripple generated in driving a synchronous motor and can reduce reactive power generated in power frequency conversion or d.c. power transmission.

According to the present invention, there is provided a power converter in which first and second power conversion units are connected with each other by a d.c. reactor, and at least one of the first and second power conversion units comprises a thyristor-based conversion unit and a self-excited conversion unit having self-extinguishing semiconductor devices for producing a commutation voltage for the thyristor-based conversion unit.

In order to manufacture a high-efficiency, high-voltage, and large-capacity power converter in small size and at low cost, the first and second power conversion units, which function as a converter and an inverter, are formed from thyristor-based conversion units consisting of thyristors and a self-excited conversion units having self-extinguishing semi-conductor devices such as GTOs. Thus, commutation from a thyristor conversion unit to another is supported by the self-excited conversion units, thereby improving the function of the thyristor-based conversion units, which constitutes the greatest feature of the present invention. Thus, a high-voltage, large-capacity power converter that is high in cost-performance can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[First Embodiment]

Figure 1:
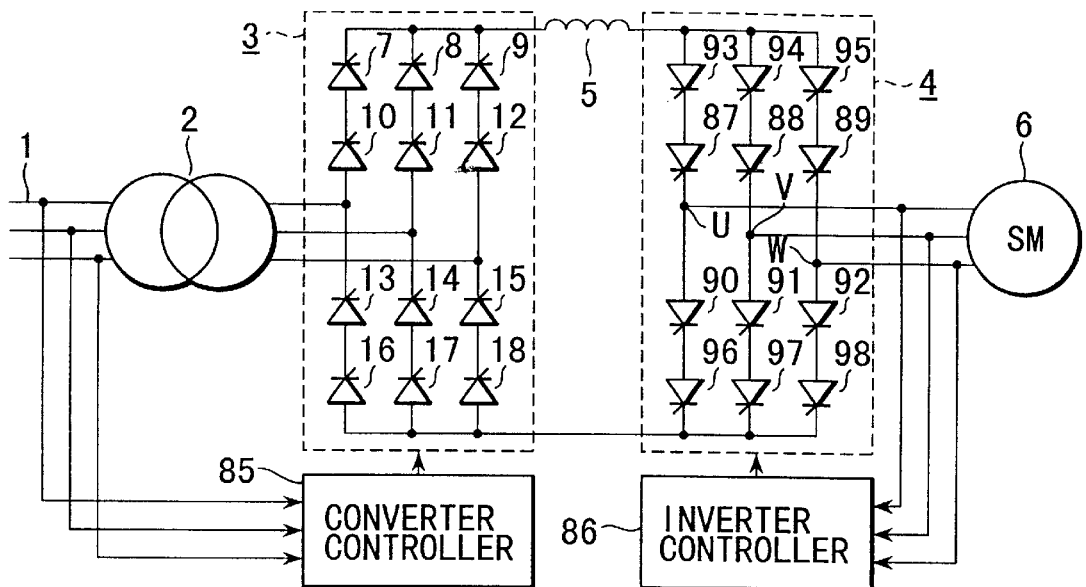
FIG. 1 shows an arrangement of a conventional power converter.
Figure 5:
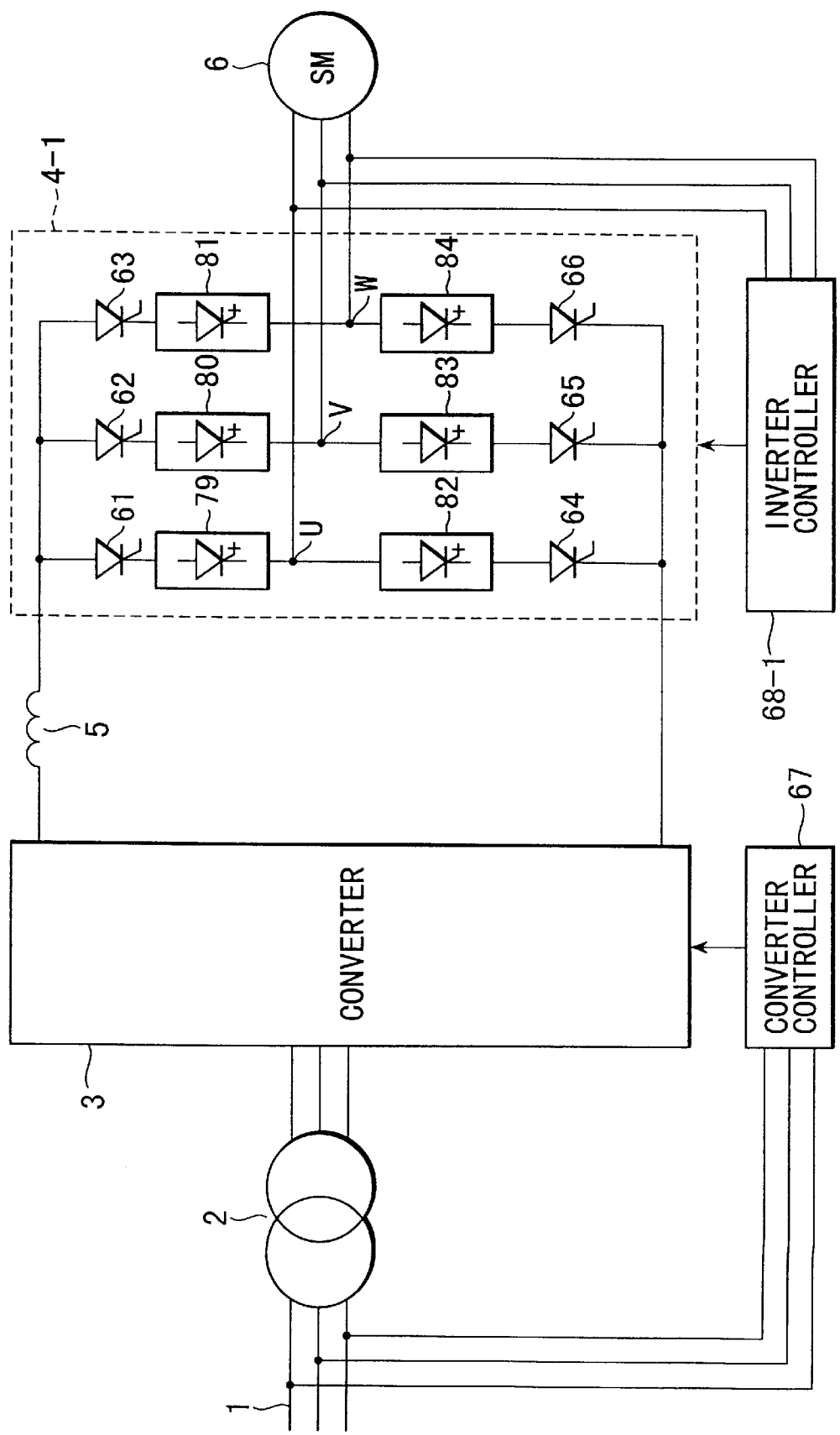
FIG. 5 is a schematic illustration of a power converter according to a first embodiment of the present invention.
Figure 6:
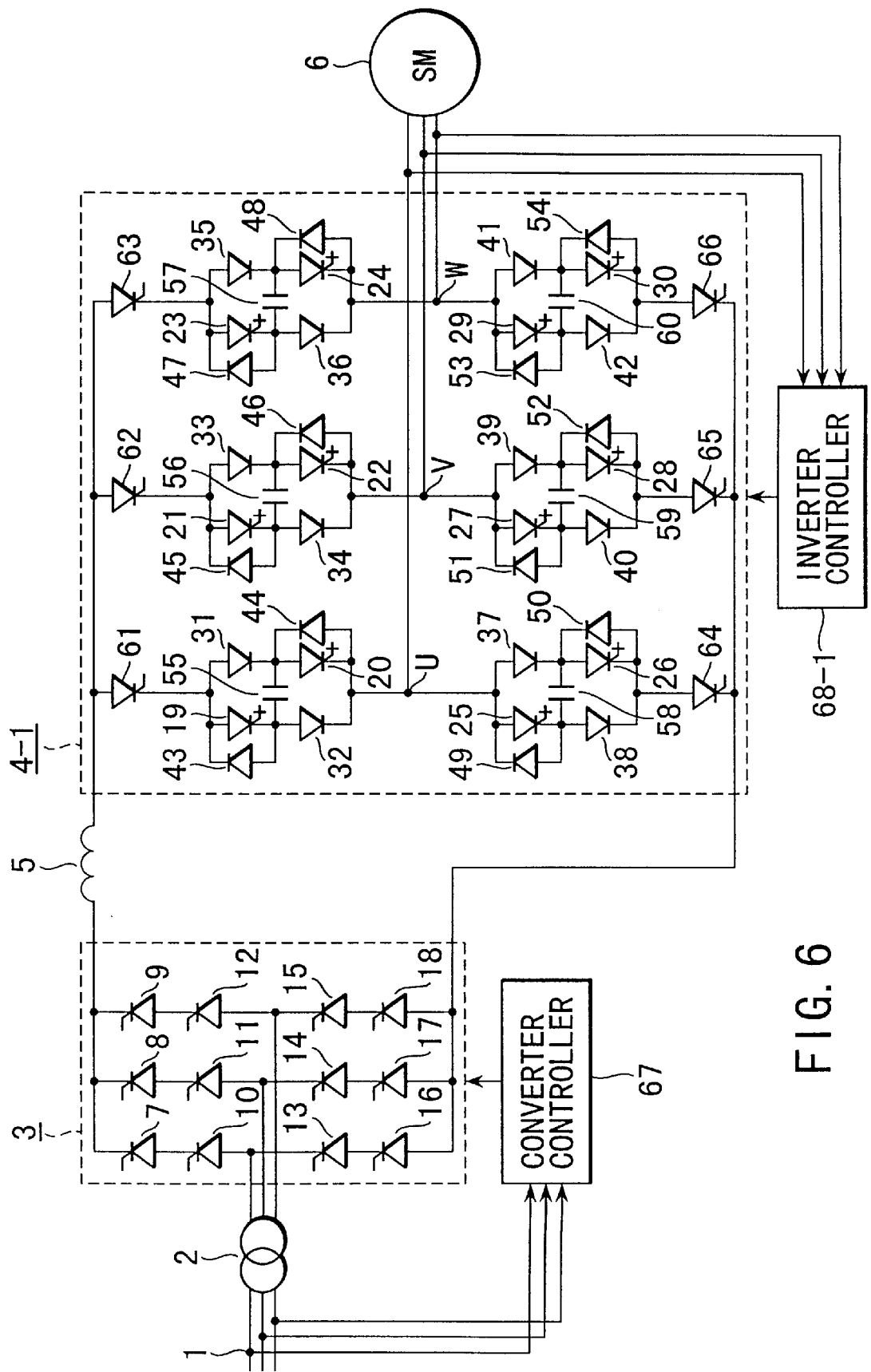
FIG. 6 shows a detailed circuit arrangement of the power converter of FIG. 5.

FIGS. 5 and 6 show a power converter according to a first embodiment of the present invention. In FIGS. 5 and 6, like reference numerals are used to denote corresponding parts to those in FIG. 1.

In FIGS. 5 and 6, a converter 3, which is linked on its a.c. side with a power supply system 1 through a transformer 2 to convert alternating current into direct current, and an inverter 4-1, which is linked on its a.c. side with a synchronous motor 6 to convert direct current into alternating current, are coupled by a d.c. reactor 5 for smoothing d.c. current flowing from the converter to the inverter.

The converter 3 is controlled by a converter controller 67 and the inverter 4-1 is associated with an inverter controller 68-1. Here, the converter 3 and the inverter 4-1 provide first and second power conversion units, respectively, of a power converter.

The converter 3 is formed mainly from a thyristor-based conversion unit in which arms comprising thyristors 7 to 18 are connected in a three-phase bridge configuration.

The main circuit of the inverter 4-1 is a composite circuit of thyristor-based conversion units 61 to 66 and a self-excited conversion unit consisting of self-excited switch units 79 to 84. That is, U-, V-, W-, X-, Y-, and Z-phase arms, each consisting of a series combination of one of thyristors 61, 62, 63, 64, 65, and 66 and one of self-excited switch units 79 to 84, are connected in a three-phase bridge configuration. Each of the self-excited switch units of U-, V-, W-, X-, Y-, and Z-phase consists of a first series combination of an antiparallel circuit in which one of GTOs 19, 21, 23, 25, 27, and 29, which are self-extinguishing semiconductor devices, and one of diodes 43, 45, 47, 49, 51, and 53 are connected in parallel with opposite polarity and one of diodes 32, 34, 36, 38, 40, and 42, a second series combination of an antiparallel circuit in which one of GTOs 20, 22, 24, 26, 28, and 30 and one of diodes 44, 46, 48, 50, 52, and 54 are connected in parallel with opposite polarity and one of diodes 31, 33, 35, 37, 39, and 41, and one of capacitors 55, 56, 57, 58, 59, and 60 which is connected between connection points in the first and second series combinations. Note that the diodes 31, 33, 35, 37, 39, and 41 provided in the respective arms are freewheeling diodes and they may be omitted depending on the load of the power converter.

The converter controller 67 controls the output current of the converter 3 with reference to the phase of the power supply 1.

The inverter controller 68-1 detects the phase of the a.c. voltage of the inverter 4-1, i.e., the phase of internal induced voltage of the synchronous motor 6 and, on the basis of the detected phase, in commutation from an arm in conduction to an arm to be conducted next, turns on simultaneously the self-excited switch unit and the thyristor in the next arm at the timing of applying a reverse voltage to the conducting arm and, at the same time, turns off the self-excited switch unit in the conducting arm, thereby controlling the output frequency of the inverter 4-1.

Next, the operation of the power converter of this embodiment thus arranged will be described with reference to a waveform diagram shown in FIG. 7.

In FIG. 5, reference is made to the phase of the power supply 1 for the converter controller 67 to control the output current of the converter 3.

Based on the phase of internal induced voltage of the synchronous motor 6 which is the phase of the a.c. voltage of the inverter 4-1, in commutation from an arm in conduction to an arm to be conducted next, the inverter controller 68 turns on simultaneously the self-excited switch unit and the thyristor in the next arm at the timing of applying a reverse voltage across the conducting arm and, at the same time, turns off the self-excited switch unit in the conducting arm, thereby controlling the output frequency of the inverter 4-1.

Figure 7:
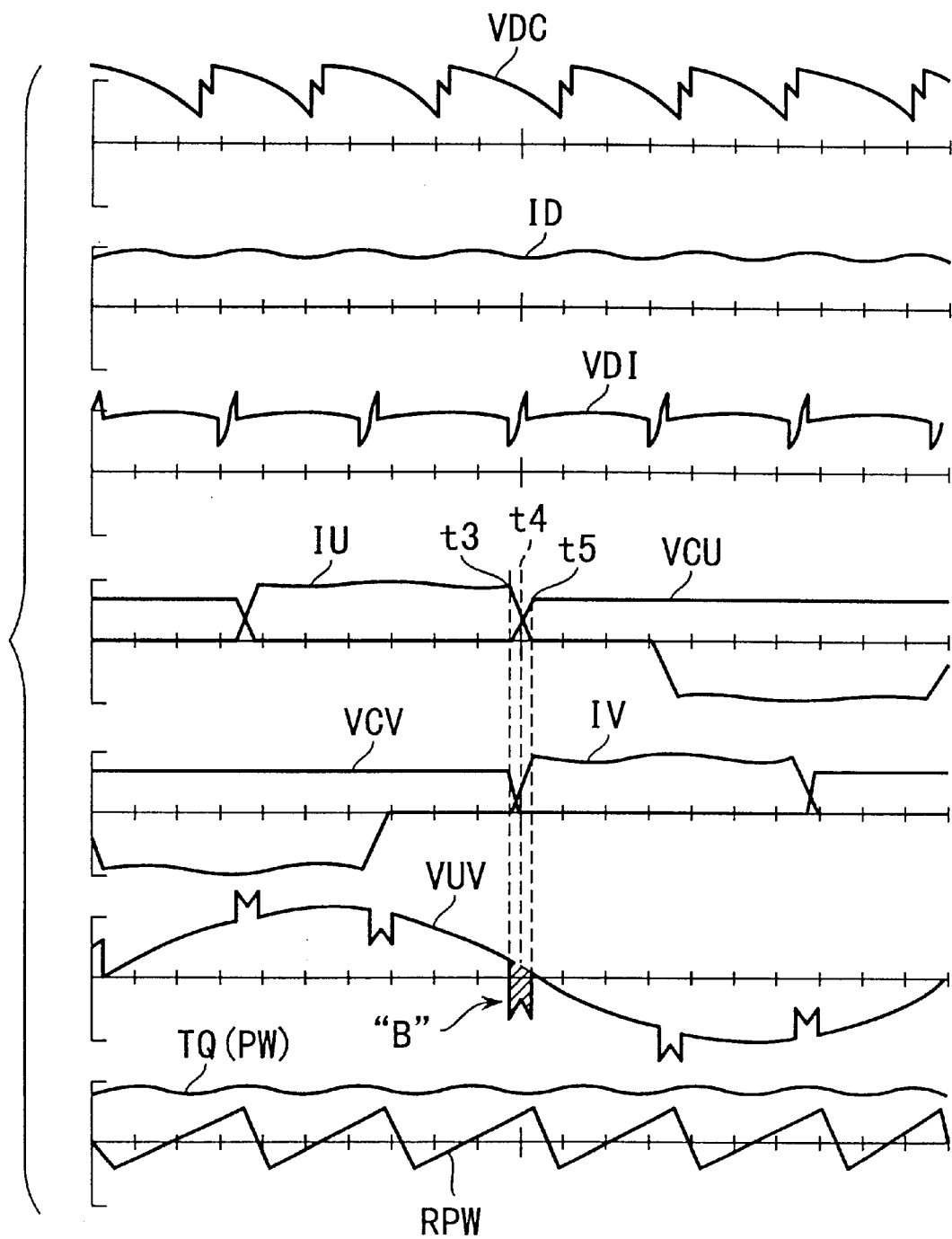
FIG. 7 is a waveform diagram for use in explanation of the operation of the power converter according to the first embodiment.
Figure 8:
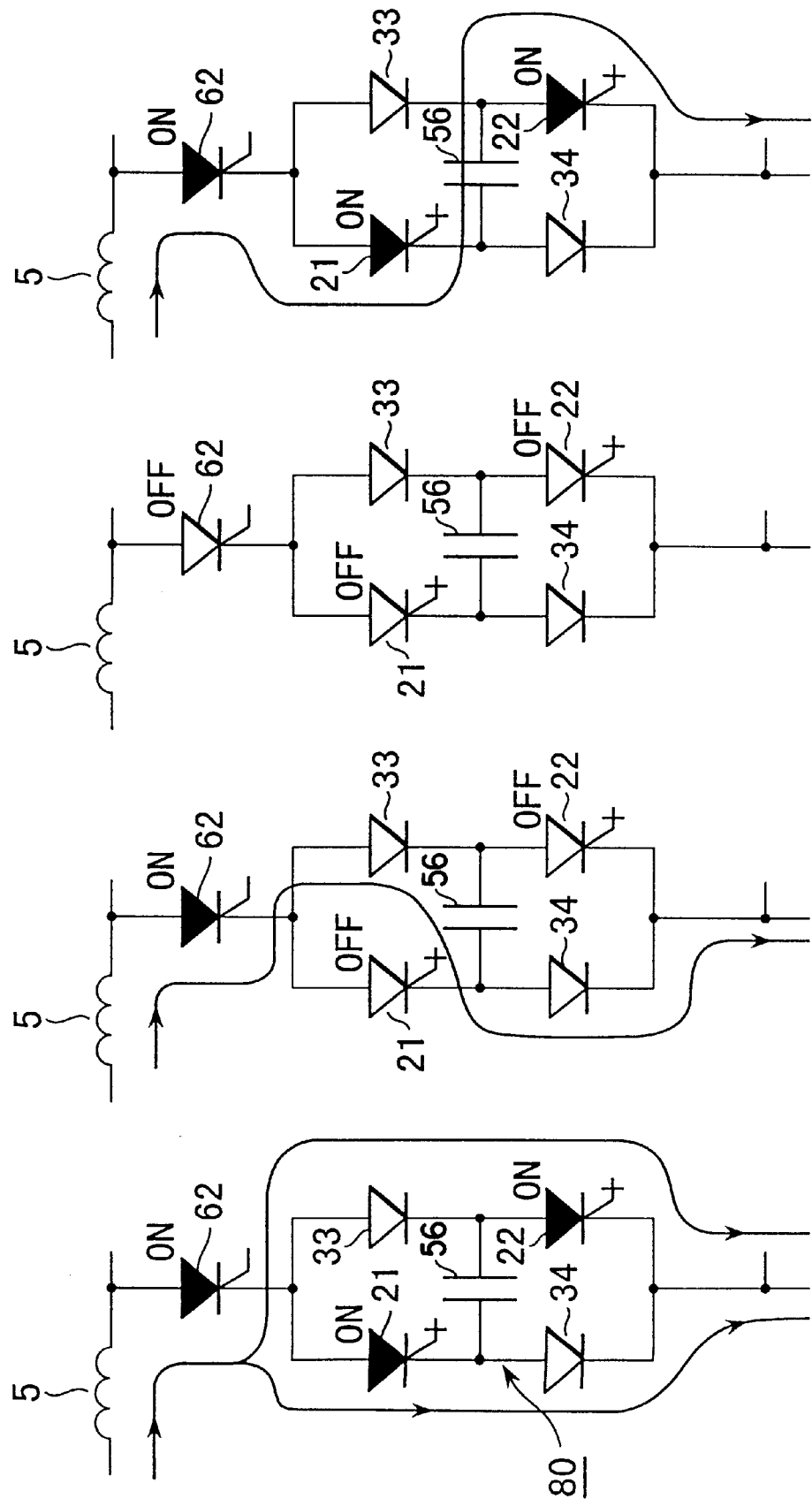
FIGS. 8A to 8D illustrate the operation of a self-excited switch unit.

That is, in FIG. 7, VDC is the d.c. output voltage of the converter 3, ID is current that flows in a d.c. circuit, VDI is d.c. input voltage of the inverter 4-1, and IU is current supplied from the U phase of the inverter 4-1 to the U phase of the synchronous motor 6. VCU is voltage across the U-phase capacitor 55, IV is current supplied from the V phase of the inverter 4-1 to the V phase of the synchronous motor 6, and VCV is voltage across the V-phase capacitor 56. Current delayed in phase by 120° with respect to the current IV flows through the W phase of the inverter 4-1. VUV is UV line voltage of the inverter 4-1. The VW line voltage and the WU line voltage of the inverter 4-1 are delayed in phase by 120° and 240°, respectively, with respect to VUV but have similar waveforms.

FIGS. 8A to 8D show the operation of an arm of the inverter. Of device components, components shown blackened are in the on state.

Here, the process of commutation from the U phase to the V phase of the inverter 4-1 will be described. First, immediately before time t3, the U-phase arm and the Z-phase arm are in conduction, so that current flows from the U phase of the inverter 4-1 through the U phase and W phase of the synchronous motor 6 into the Z phase of the inverter.

Next, at time t3, a firing pulse is applied to the V-phase arm of the inverter 4-1, i.e., the GTO 21, the GTO 22, and the thyristor 62. At this point, the UV line voltage VUV of the synchronous motor 6 is slightly positive. The capacitor 56 has been charged to voltage VCV with a polarity such that the cathode side of the GTO 21 is negative and the anode side of the GTO 22 is positive. The sum of VUV and VCV is applied as commutation voltage. Thus, a forward voltage of (VUV+VCV) is applied to the GTO 21, the GTO 22, and the thyristor 62. In such a state, application of a firing pulse turns on the GTO 21, the GTO 22, and the thyristor 62 (see FIG. 8A).

At this point, a commutation voltage indicated at B is applied to the UV leakage inductance of the synchronous motor 6, decreasing the U-phase current IU and increasing the V-phase current IV. Thus, commutation is accomplished. The capacitor 56 is discharged by the V-phase current IV. When the voltage VCV across the capacitor 56 falls to zero, the diodes 33 and 34 are rendered conductive, terminating the discharge of the capacitor 56.

Next, when, at time t4, the U-phase current IU decreases to 50%, the GTOs 19 and 20 turn off. Thus, the U-phase current IU flows through the diode 32, the capacitor 44, and the diode 31, charging the capacitor 55, so that the voltage VCU across it increases. At this point, VCU+VCV+VUV is applied as commutation voltage, allowing the commutation to progress (see FIG. 8B).

Next, when, at time t5, the U-phase current IU reaches zero, the commutation is completed (see FIGS. 8C and 8D). TQ is torque generated by the synchronous motor 6, which is in proportion to active power PW injected for the internal induced voltage of the synchronous motor 6. RPW is reactive power injected for the internal induced voltage of the synchronous motor 6.

Figure 9:
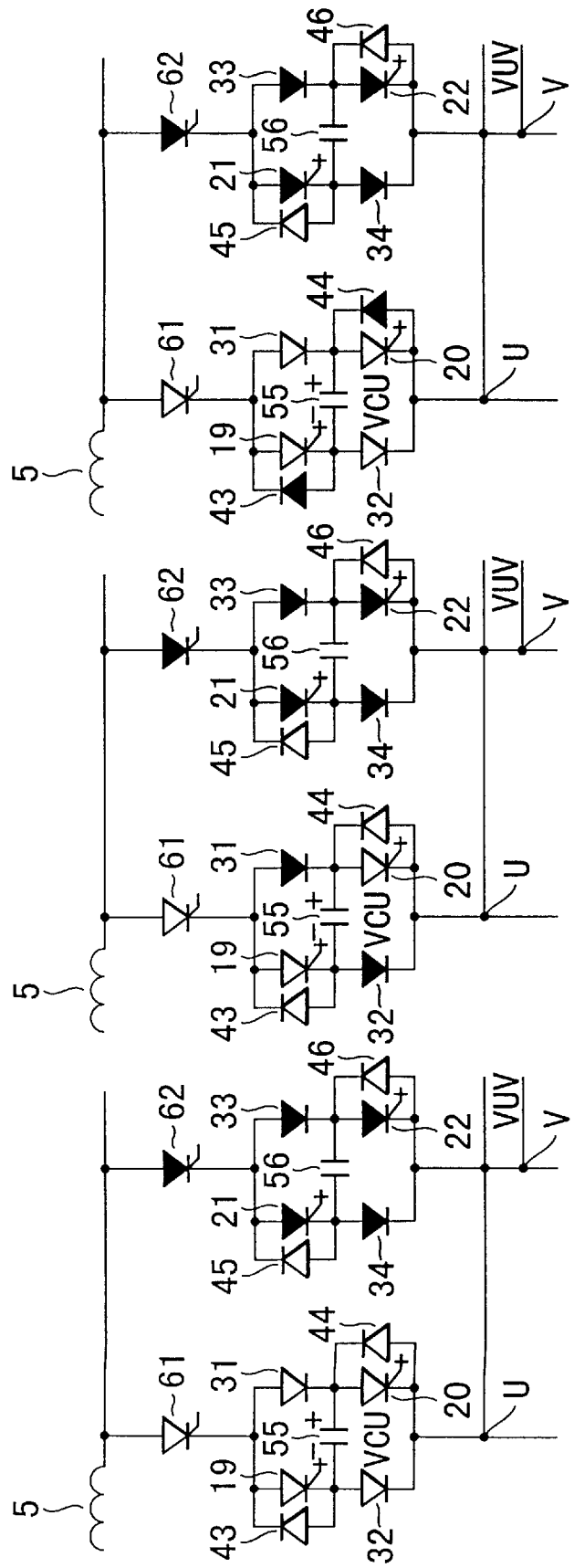
FIGS. 9A to 9C illustrate the operation of the power converter according to the first embodiment.

FIGS. 9A to 9C show states where the commutation is completed and the U-phase current IU reaches zero. Of device components, components shown blackened are in the on state.

At this point, a voltage of VUV+VCU is divided among the thyristor 61 and the diodes 31 and 32, so that a fraction of that voltage is applied across each component as a reverse voltage. A voltage of (VCU−(VUV+VCU))/3 is applied across each of the GTOs 19 and 20.

FIG. 9B shows the state where the UV line voltage VUV of the synchronous motor 6 is negative but larger in magnitude than the voltage VCU across the capacitor 55.

The diodes 31 and 32 are turned on, so that a forward voltage of (−VUV−VCU) is applied across the thyristor 61. VCU is applied across each of the GTOs 19 and 20.

FIG. 9C shows the state where the UV line voltage VUV of the synchronous motor 6 is positive and larger in magnitude than the voltage VCU across the capacitor 55.

The diodes 43 and 44 are turned on, so that a reverse voltage of (VUV−VCU) is applied across the thyristor 61. At this point, the voltage applied across each of the GTOs 19 and 20 is zero.

As described above, the diodes 31 and 32 or the diodes 43 and 44 are rendered conductive, depending on the polarity of the UV line voltage VUV of the synchronous motor 6, allowing the voltage VCU across the capacitor 55 to be applied all the time in a direction to cancel out the UV line voltage VUV of the synchronous motor 6. Thereby, the voltage across the thyristor 61 is reduced.

In the above description, although only workings of the U phase were described, the workings of the other phases remain unchanged.

Although, in the above description, the timing t4 of turning off the GTOs 19 and 20 of the U phase was set to the time at which the U-phase current IU falls to 50%, t4 may be set to any other time. Alternatively, a firing pulse may be applied to the GTOs 21 and 22 and the thyristor 62 of the V phase so that they are turned off simultaneously with the GTOs 19 and 20 of the U phase.

Turning off the GTOs 19 and 20 when the U-phase current IU is large allows the capacitor 55 to begin to be charged at time t3, i.e., allows the time at which the voltage VCU across the capacitor 55 rises to be made earlier. This results in a higher commutation voltage.

In this case, however, the GTOs 19 and 20 are required to turn off large current and thus the burden on them increases. It is therefore desirable to wait until there is some decrease in the U-phase current IU.

The timing of applying a firing pulse can be readily determined by microcomputer-based processing or the like on the basis of the phase of the a.c. voltage of the inverter 4-1 as hitherto, i.e., the phase of the terminal voltage of the synchronous motor 6.

As described above, the power converter of this embodiment is arranged such that a self-excited switch unit using GTOs, self-extinguishing semiconductor devices, and a thyristor are connected in series to form a unit arm, such unit arms are connected in a bridge configuration to form a current type converter, and a fraction of commutation voltage is applied across the thyristor by turning off the self-excited switch unit at the time of commutation.

As described in connection with FIG. 7, therefore, since commutation is made possible at a margin-of-commutation angle of near zero, the power converter can be operated at a power factor of unity.

Figure 2:
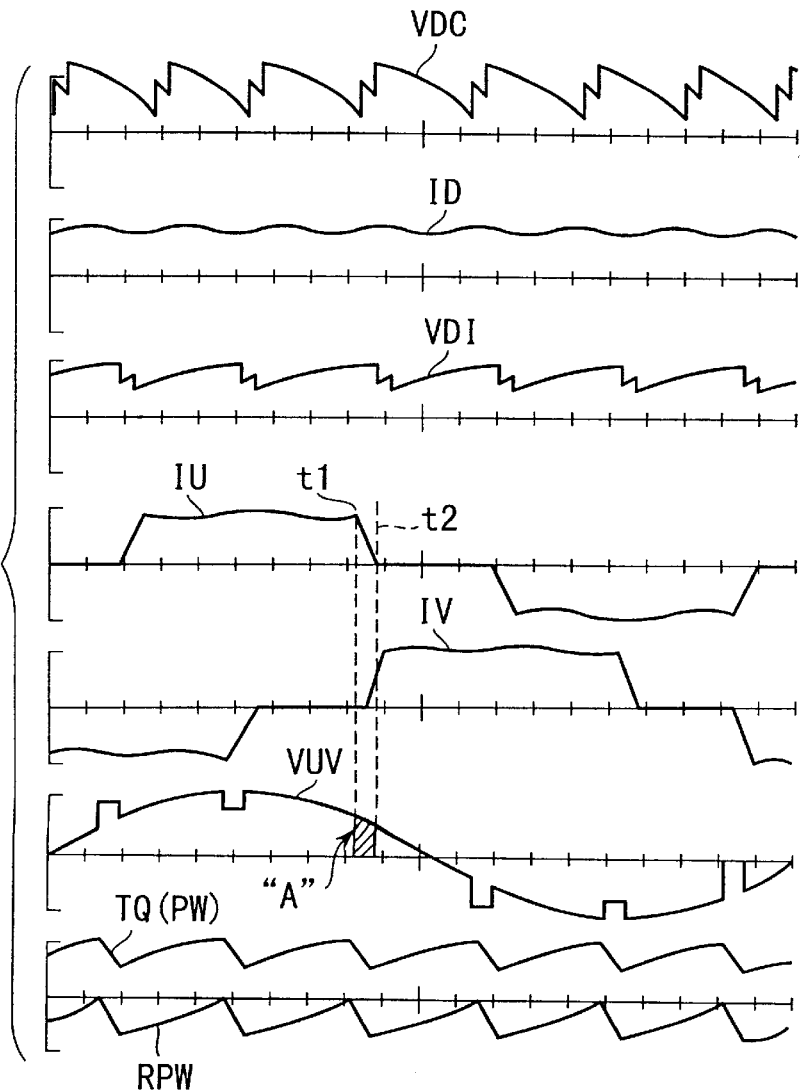
FIG. 2 is a waveform diagram for use in explanation of the operation of the power converter of FIG. 1.

Thus, the application of the power converter of the present embodiment to the commutatorless motor system described in FIG. 7 allows the synchronous motor to be operated with far less torque ripple, which is evident from comparison between the waveform TQ of torque generated by the conventional synchronous motor shown in FIG. 2 and the waveform TQ of torque generated by the synchronous motor of the present embodiment shown in FIG. 7.

[Modification of First Embodiment]

The power converter of this embodiment is arranged to control the output frequency of the inverter 4-1 by adding current detecting means for detecting current in each arm of the inverter to the above-described power converter of the first embodiment and causing the inverter controller 68 to, on the basis of the phase of the internal induced voltage of the synchronous motor 6 detected by the above-described means and current in each arm of the inverter detected by the current detecting means, in commutation from an arm in conduction to an arm to be conducted next, turn on simultaneously the self-excited switch unit and the thyristor in the next arm at the phase at which a backward voltage is applied across the conducting arm and turn off the self-excited switch unit in the conducting arm when current in the conducting arm falls below a predetermined value.

The power converter thus arranged not only provides the same advantages as the power converter of the first embodiment but also reduces current when the GTOs 19 and 20 are turned off, i.e., reduces their switching loss at off time. This is because the power converter is arranged to, in commutation from an arm in conduction to an arm to be conducted next, turn on simultaneously the self-excited switch unit and the thyristor in the next arm at the phase at which a backward voltage is applied across the conducting arm and turn off the self-excited switch unit in the conducting arm when current in the conducting arm falls below a predetermined value.

Thus, the efficiency of the power converter can be improved.

[Second Embodiment]

Figure 10:
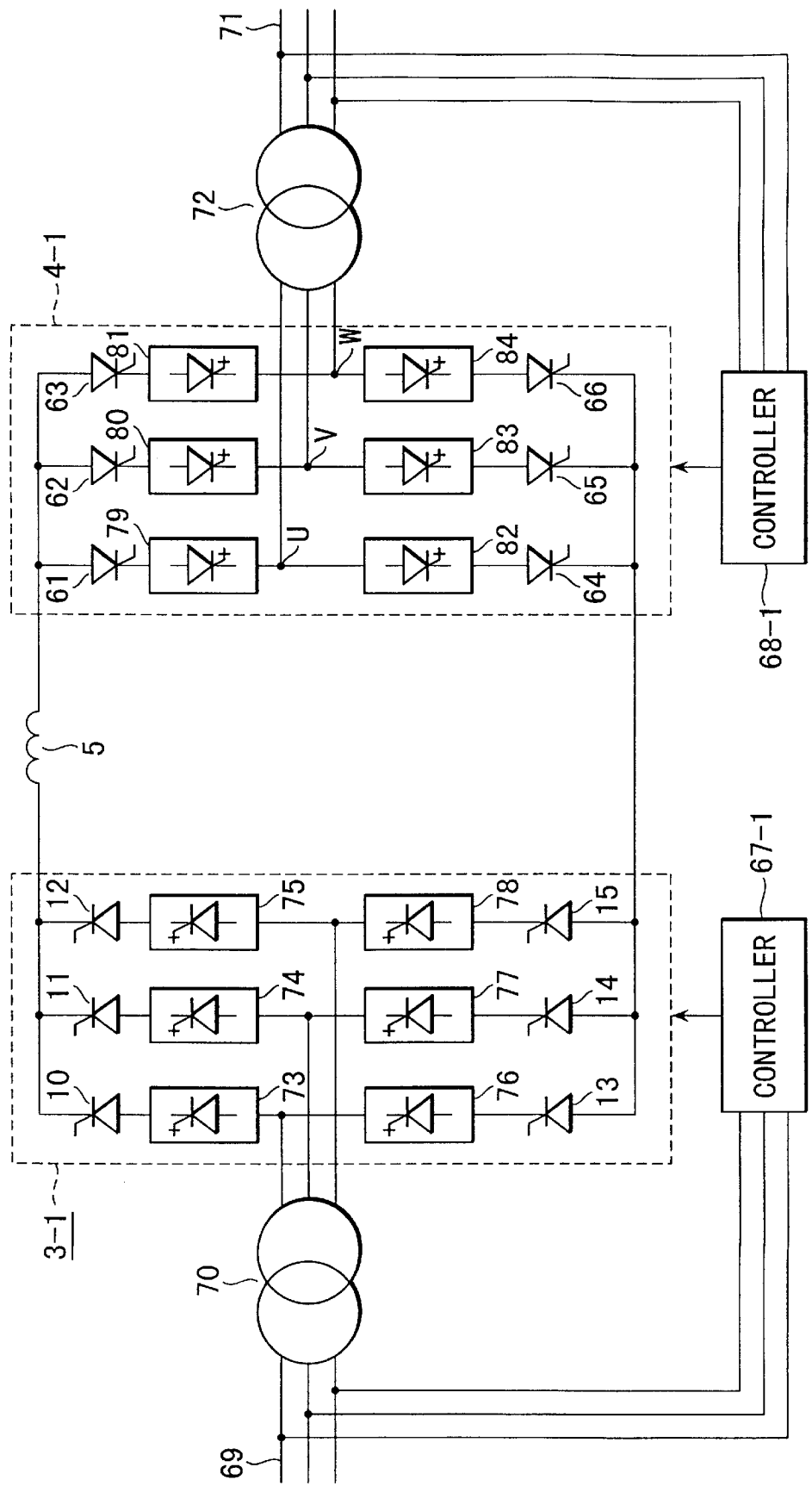
FIG. 10 is a schematic illustration of a power converter according to a second embodiment of the present invention.
Figure 11:
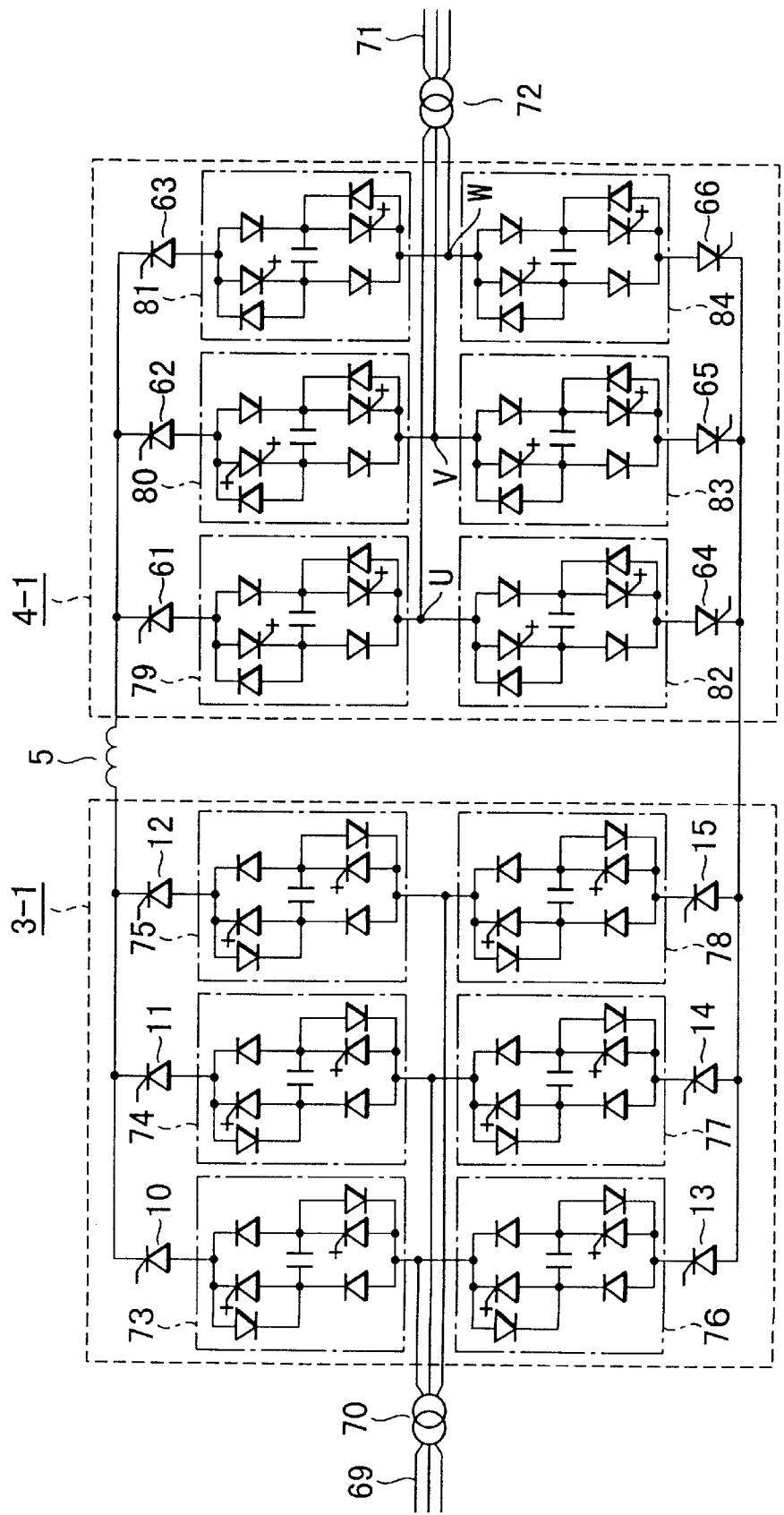
FIG. 11 shows a detailed circuit arrangement of the power converter of FIG. 10.

FIGS. 10 and 11 show an arrangement of a power converter according to a second embodiment of the present invention. In these figures, like reference numerals are used to denote corresponding components to those in FIGS. 3 and 6.

In FIGS. 10 and 11, a converter 3-1 is linked on its a.c. side with a first power supply system 69 by a first transformer 70 and converts alternating current into direct current or vice versa.

An inverter 4-1 is linked on its a.c. side with a second power supply system 71 by a second transformer 72 and converts direct current into alternating current or vice versa.

The converter 3-1 and the inverter 4-1 have their d.c. circuits coupled together by a d.c. reactor 5 adapted to smooth d.c. current flowing from the converter to the inverter.

A converter controller 67-1 and an inverter controller 68-1 are associated with the converter 3-1 and the inverter 4-1, respectively.

The inverter 4-1 is arranged identically to the inverter 4-1 shown in FIG. 6. That is, arms of U-, V-, W-, X-, Y-, and Z-phase are connected in a three-phase bridge configuration each of which consists of a series combination of one of thyristors 61, 62, 63, 64, 65, and 66 and one of self-excited switch units 79, 80, 81, 82, 83, and 84. Each of the self-excited switch units of U-, V-, W-, X-, Y-, and Z-phase consists of a first series combination of an antiparallel circuit in which one of GTOs 19, 21, 23, 25, 27, and 29, which are self-extinguishing semiconductor devices, and one of diodes 43, 45, 47, 49, 51, and 53 are connected in parallel with opposite polarity and one of diodes 32, 34, 36, 38, 40, and 42, a second series combination of an antiparallel circuit in which one of GTOs 20, 22, 24, 26, 28, and 30 and one of diodes 44, 46, 48, 50, 52, and 54 are connected in parallel with opposite polarity and one of diodes 31, 33, 35, 37, 39, and 41, and one of capacitors 55, 56, 57, 58, 59, and 60 which is connected between connection points in the first and second series combinations.

The converter 3-1 is also arranged identically to the inverter 4-1. That is, arms of U-, V-, W-, X-, Y-, and Z-phase are connected in a three-phase bridge configuration each of which consists of a series combination of one of thyristors 10, 11, 12, 13, 14, and 15 and one of self-excited switch units 73, 74, 75, 76, 77, and 78. Each of the self-excited switch units of U-, V-, W-, X-, Y-, and Z-phase consists of a first series combination of an antiparallel circuit in which one of GTOs 19, 21, 23, 25, 27, and 29, which are self-extinguishing semiconductor devices, and one of diodes 43, 45, 47, 49, 51, and 53 are connected in parallel with opposite polarity and one of diodes 32, 34, 36, 38, 40, and 42, a second series combination of an antiparallel circuit in which one of GTOs 20, 22, 24, 26, 28, and 30 and one of diodes 44, 46, 48, 50, 52, and 54 are connected in parallel with opposite polarity and one of diodes 31, 33, 35, 37, 39, and 41, and one of capacitors 55, 56, 57, 58, 59, and 60 which is connected between connection points in the first and second series combinations.

The converter controller 67-1 detects the phase of the first power supply 69 by means not shown and, on the basis of the detected phase, in commutation from an arm in conduction to an arm to be conducted next, turns on simultaneously the self-excited switch unit and the thyristor in the next arm at the phase at which a backward voltage is applied from the conducting arm and, at the same time, turns off the self-excited switch unit in the conducting arm, thereby controlling the output current of the converter 3-1.

The inverter controller 68-1 detects the phase of the a.c. voltage of the inverter 4-1 by means not shown and, on the basis of the detected phase, in commutation from an arm in conduction to an arm to be conducted next, turns on simultaneously the self-excited switch unit and the thyristor in the next arm at the phase at which a backward voltage is applied to the conducting arm and, at the same time, turns off the self-excited switch unit in the conducting arm, thereby controlling the output frequency of the inverter 4-1.

The power converter of the second embodiment is intended for use as a frequency conversion system for power system that interchanges electricity between power supply systems different in frequency or a conversion system for d.c. power transmission which converts a.c. power into high d.c. voltage for transmission to a distant place and reconverts the transmitted d.c. voltage into a.c. power.

The workings of the power converter of the second embodiment are substantially the same as those of the power converter of the first embodiment described in connection with FIG. 6 through FIGS. 9A to 9C. Thus, description thereof is omitted and only the differences will be described herein.

When used as a power frequency conversion system or conversion system for d.c. power transmission, the power converter of this embodiment, which is arranged to, in commutation from an arm in conduction to an arm to be conducted next, turn on simultaneously the self-excited switch unit and the thyristor in the next arm at the phase at which a backward voltage is applied to the conducting arm and, at the same time, turns off the self-excited switch unit in the conducting arm, allows the reactive power to be made zero on average. For this reason, the need of the leading capacitors 103 and 104 of large capacity shown in FIG. 3 can be eliminated.

Thus, large installment space for such capacitors can be saved.

As described above, the power converter of the second embodiment can reduce reactive power, providing highly economical apparatus.

[Modification of Second Embodiment]

In the power converter of this embodiment, the output frequency of the inverter 4-1 is controlled by adding current detecting means for detecting current in each arm of the inverter to the above-described power converter of the first embodiment and causing the inverter controller 68-1 to, on the basis of the phase of the a.c. voltage of the inverter detected by the above-described means and current in each arm of the inverter detected by the current detecting means, in commutation from an arm in conduction to an arm to be conducted next, turn on simultaneously the self-excited switch unit and the thyristor in the next arm at the phase at which a backward voltage is applied across the conducting arm and turn off the self-excited switch unit in the conducting arm when current in the conducting arm falls below a predetermined value.

The output current of the converter 3-1 is controlled by adding current detecting means for detecting current in each arm of the converter and causing the converter controller 67-1 to, on the basis of the phase of the first power supply 69 detected by the above-described means and current in each arm of the inverter detected by the current detecting means, in commutation from an arm in conduction to an arm to be conducted next, turn on simultaneously the self-excited switch unit and the thyristor in the next arm at the phase at which a backward voltage is applied across the conducting arm and turn off the self-excited switch unit in the conducting arm when current in the conducting arm falls below a predetermined value.

The power converter thus arranged provides the same advantages as the power converter of the second embodiment by, in commutation from an arm in conduction to an arm to be conducted next in the converter and the inverter, turning on simultaneously the next arm in the self-excited switch unit and the thyristor in the next arms at the phase at which a backward voltage is applied across the conducting arms and turning off the self-excited switch unit in the conducting arm when current in the conducting arm falls below a predetermined value.

In addition, when used as a power frequency converter or converter for d.c. power transmission, the power converter can reduce current when the GTOs 19 and 20 of the U phase are turning off, i.e., reduce their switching loss at off time. This is because the inverter 4-1 can turn off the GTOs 19 and 20 at time t4 when the U-phase current IU falls to a certain value. The same holds for the other phases.

Since stress to which the GTOs 19 and 20 are subjected when they are turned off can be reduced, the probability of failure of the GTOs in the self-excited switch units can be reduced. The same holds true for the converter 3-1.

[Third Embodiment]

Figure 12:
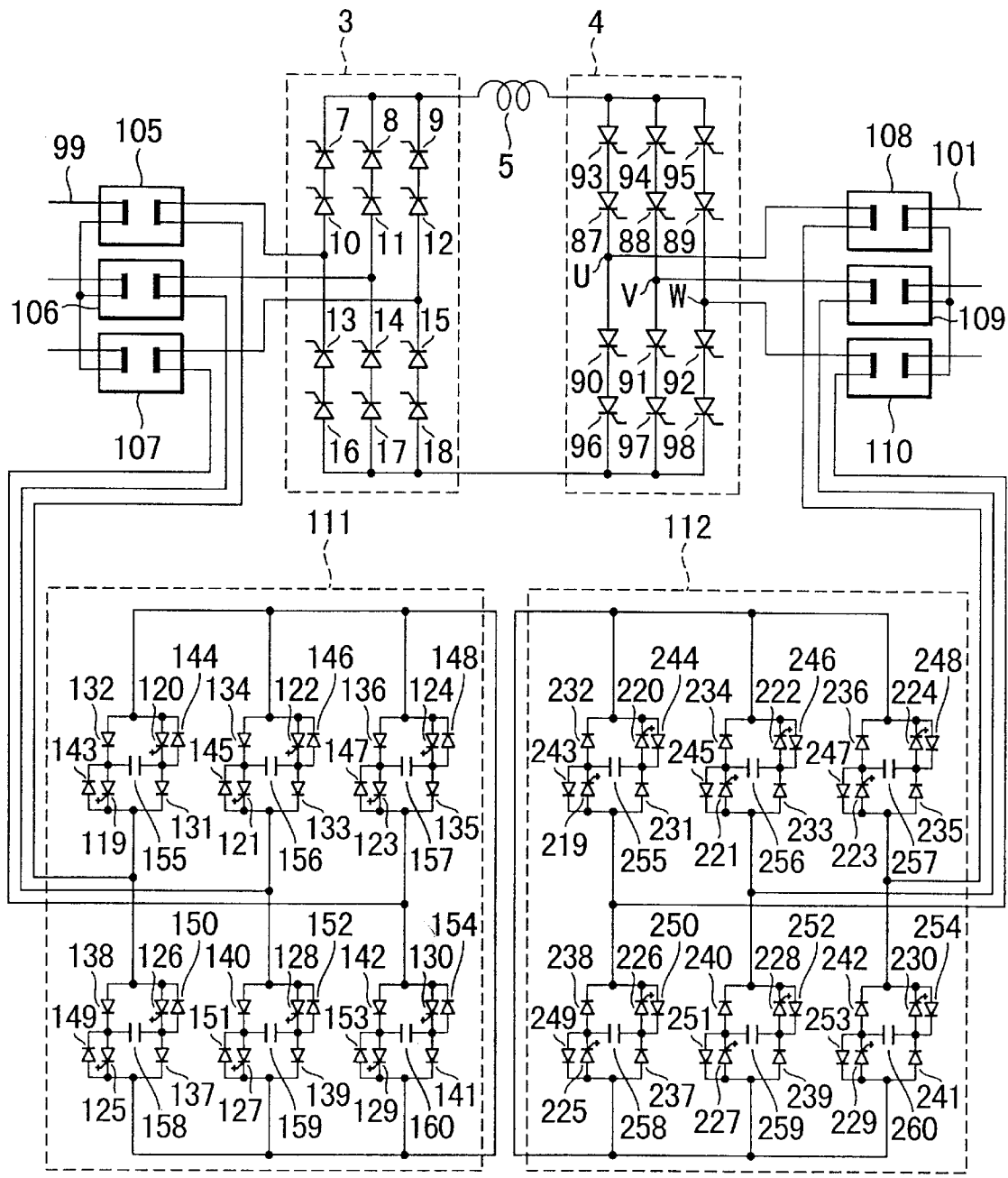
FIG. 12 shows a circuit arrangement of a power converter according to a third embodiment of the present invention.

FIG. 12 shows an arrangement of a power converter according to a third embodiment of the present invention. In these figures, like reference numerals are used to denote corresponding components to those in FIGS. 3 and 6.

In FIG. 12, a converter 3-1 is linked on its a.c. side with a first power supply system 99 by first single-phase transformers 105, 106 and 107 and converts alternating current into direct current or vice versa.

An inverter 4-1 is linked on its a.c. side with second power supply system 101 by second single-phase transformers 108, 109 and 110 and converts direct current into alternating current or vice versa.

The converter 3-1 and the inverter 4-1 have their d.c. circuits coupled together by a d.c. reactor 5 adapted to smooth d.c. current flowing from the converter to the inverter.

Self-excited converters 111 and 112 are associated with the converter 3-1 and the inverter 4-1, respectively.

Although a converter controller and an inverter controller are provided in the power converter of FIG. 12 as in FIG. 10, they are omitted in FIG. 12 for simplicity.

In each of the converter 3-1 and the inverter 4-1, arms composed of thyristors 7 to 18/87 to 98 are connected in a three-phase bridge configuration.

In the self-excited converter 111, self-excited switch units of U-, V-, W-, X-, Y-, and Z-phase are connected in a three-phase bridge configuration each of which consists of a first series combination of an antiparallel circuit in which one of GTOs 119, 121, 123, 125, 127, and 129, which are self-extinguishing semiconductor devices, and one of diodes 143, 145, 147, 149, 151, and 153 are connected in parallel with opposite polarity and one of diodes 132, 134, 136, 138, 140, and 142, a second series combination of an antiparallel circuit in which one of GTOs 120, 122, 124, 126, 128, and 130 and one of diodes 144, 146, 148, 150, is 152, and 154 are connected in parallel with opposite polarity and one of diodes 131, 133, 135, 137, 139, and 141, and one of capacitors 155, 156, 157, 158, 159, and 160 which is connected between connection points in the first and second series combinations.

The self-excited converter 112 is also configured identically to the self-excited converter 111. That is, self-excited switch units of U-, V-, W-, X-, Y-, and Z-phase are connected in a three-phase bridge configuration each of which consists of a first series combination of an antiparallel circuit in which one of GTOs 219, 221, 223, 225, 227, and 229, which are self-extinguishing semiconductor devices, and one of diodes 243, 245, 247, 249, 251, and 253 are connected in parallel with opposite polarity and one of diodes 232, 234, 236, 238, 240, and 242, a second series combination of an antiparallel circuit in which one of GTOs 220, 222, 224, 226, 228, and 230 and one of diodes 244, 246, 248, 250, 252, and 254 are connected in parallel with opposite polarity and one of diodes 231, 233, 235, 237, 239, and 241, and one of capacitors 255, 256, 257, 258, 259, and 260 which is connected between connection points in the first and second series combinations.

A.c. terminals of the self-excited converter 111 are each connected to one terminal on the secondary of a corresponding one of the first single-phase transformers 105, 106 and 107 whose primary circuits are in star connection (Y connection). A.c. terminals of the converter 3-1 are each connected to the other terminal on the secondary of a corresponding one of the first single-phase transformers. Likewise, a.c. terminals of the self-excited converter 112 are each connected to one terminal on the secondary of a corresponding one of the second single-phase transformers 108, 109 and 110 whose primary circuits are in star connection (Y connection). A.c. terminals of the inverter 4-1 are each connected to the other terminal on the secondary of a corresponding one of the second single-phase transformers.

That is, the first single-phase transformer 105 of the U phase has one of its secondary terminals is connected to the U phase of the converter 3-1 and the other terminal connected to the U phase of the self-excited converter 111. Likewise, the single-phase transformers of the V and W phases are connected to the V and W phases, respectively, of each of the converter 3-1 and the self-excited converter 111. Likewise, the U, V and W phases of each of the inverter 4-1 and the self-excited converter 112 are connected to the second single-phase transformers 108, 109 and 110, respectively.

In commutation, the corresponding arms of the inverter 4-1 and the self-excited converter 112 are turned on or off in the same phase. In commutation from a thyristor in conduction to a thyristor to be conducted next in the inverter 4-1, the inverter controller, on the basis of the phase of the second power supply 101 detected by the phase detecting means (the phase of a.c. voltage of the inverter 4-1), turns on simultaneously the arm to be conducted next of the self-excited converter 112 and the thyristor to be conducted next of the inverter at the phase at which a backward voltage is applied across the conducting thyristor and, at the same time, turns off the self-excited switch unit in the conducting arm of the self-excited converter 112, thereby controlling the output frequency of the inverter 4-1.

In commutation, the corresponding arms of the converter 3-1 and the self-excited converter 111 are turned on or off in the same phase. In commutation from a thyristor in conduction to a thyristor to be conducted next in the converter 3-1, the converter controller, on the basis of the phase of the first power supply 99 detected by the phase detecting means (the phase of a.c. voltage of the converter 3-1), turns on simultaneously the arm to be conducted next of the self-excited converter 111 and the thyristor to be conducted next of the converter at the phase at which a backward voltage is applied across the conducting thyristor and, at the same time, turns off the self-excited switch unit in the conducting arm of the self-excited converter 111, thereby controlling the output current of the converter 3-1.

The power converter of the third embodiment is intended for use as a frequency conversion system for power system that interchanges electricity between power supply systems different in frequency or a conversion system for d.c. power transmission which converts a.c. power into high d.c. voltage for transmission to a distant place and reconverts the transmitted d.c. voltage into a.c. power.

Next, the workings of the power converter of the third embodiment thus arranged will be described with reference to FIG. 6.

Figure 13:
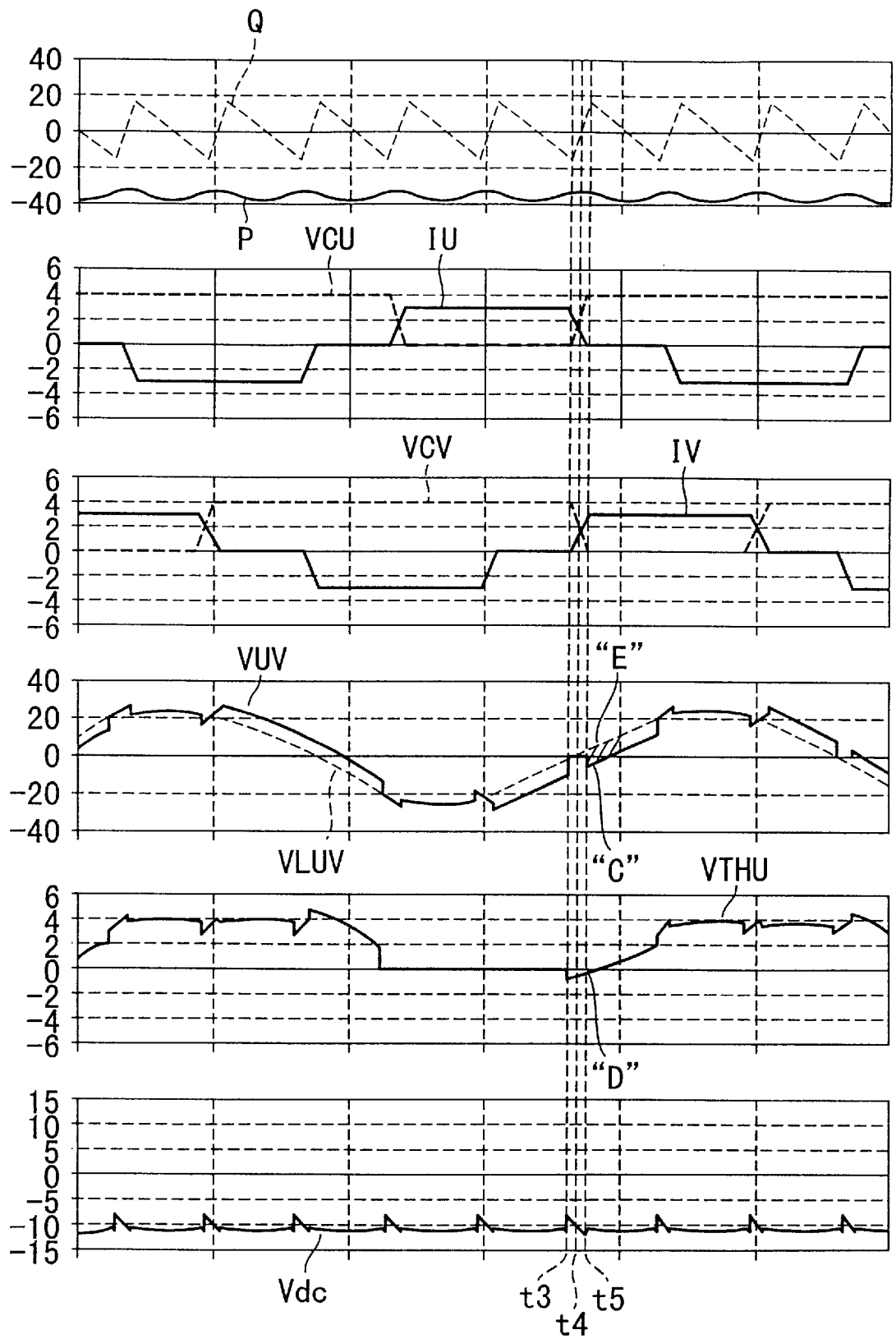
FIG. 13 is a waveform diagram for use in explanation of the operation of the power converter according to the third embodiment.

In FIG. 13, p is active power of the converter 3-1 and Q is reactive power of the converter. IU is current supplied from the first single-phase transformer 105 to the U phase of the converter 3-1. IV is current supplied from the first single-phase transformer 106 to the V phase of the converter 3-1. Likewise, current that is delayed in phase by 120° with respect to IV flows through the W phase of the converter 3-1. VLV is UV line voltage of the converter 3-1. The VW line voltage and the WU line voltage of the converter 3-1 are delayed in phase by 120° and 240°, respectively, with respect to VUV but have similar waveforms.

Here, the commutation process from U to V phase of the converter will be described.

First, immediately before time t3, the U-phase arm and the Z-phase arm of the converter 3-1 are in conduction and the U- and Z-phase self-excited switch units of the self-excited converter 111 are in conduction, so that current flows from the Z phase of the converter 3-1 through the first single-phase transformer 107, the Z-phase self-excited switch unit, the U-phase self-excited switch unit, and the first single-phase transformer 105 to the U phase of the converter.

Next, at time t3, a firing pulse is applied to the V-phase arm of the converter 3-1. That is, a firing pulse is applied to the GTOs 140 and 141 and the thyristors 8 and 11. At this point, the UV line voltage VLUV of the first power supply 99 is near zero. The capacitor 175 has been charged to VCV with a polarity such that the cathode side of the GTO 140 is negative and the anode side of the GTO 141 is positive. The sum of VUV and VCV is applied as a commutation voltage.

Thus, a forward voltage of VUV+VCV is applied across the GTOs 140 and 141 and the thyristors 8 and 11. In this state, application of a firing pulse turns them on.

At this point, a commutation voltage resulting from leakage inductance of the single-phase transformer is applied to decrease the U-phase current and increase the V-phase current IV, thus accomplishing commutation. The capacitor 175 is discharged by the V-phase current IV. When the voltage VCV across the capacitor 175 reaches zero, the diodes 152 and 153 are rendered conductive, terminating discharging of the capacitor 175.

Next, when, at time t4, the U-phase current falls down to 50%, the GTOs 138 and 139 turn off. Then, the U-phase current flows through the diode 150, the capacitor 150, and the diode 151, so that the capacitor 174 is charged to increase its voltage VCU. At this point, VCU+VCV+VUV is applied as a commutation voltage, causing commutation to progress.

Next, when, at time t5, the U-phase current reaches zero, commutation is completed. At this point, the UV line voltage VUV of the converter 3-1 is the sum of the UV line voltage VLUV of the first power supply 99 and the voltage VCV across the capacitor 75 which has been charged during the time interval between t4 and t5. For this reason, "C" in the UV line voltage of the converter 3-1 corresponds to "D" in the thyristor voltage VTHU.

The above operation allows commutation at a margin-of-operation angle of nearly zero. At this point, however, since the UV voltage of the first power supply 99 has had a positive value ("E" in FIG. 13), the circuit configuration with the converter 3-1 alone would cause a failure in commutation.

As described above, the power converter of this embodiment is arranged such that GTO-based self-excited switch units are connected in the form of a six-bridge self-excited converter, the self-excited converter is connected in series with a thyristor-based converter through transformers, and a fraction of commutation voltage is applied to series-connected thyristors by turning off self-excited switch units at the time of commutation.

Thus, since commutation at a margin-of-operation angle of nearly zero is made possible as described in connection with FIG. 13, the power converter can be operated at a power factor of unity.

Figure 4:
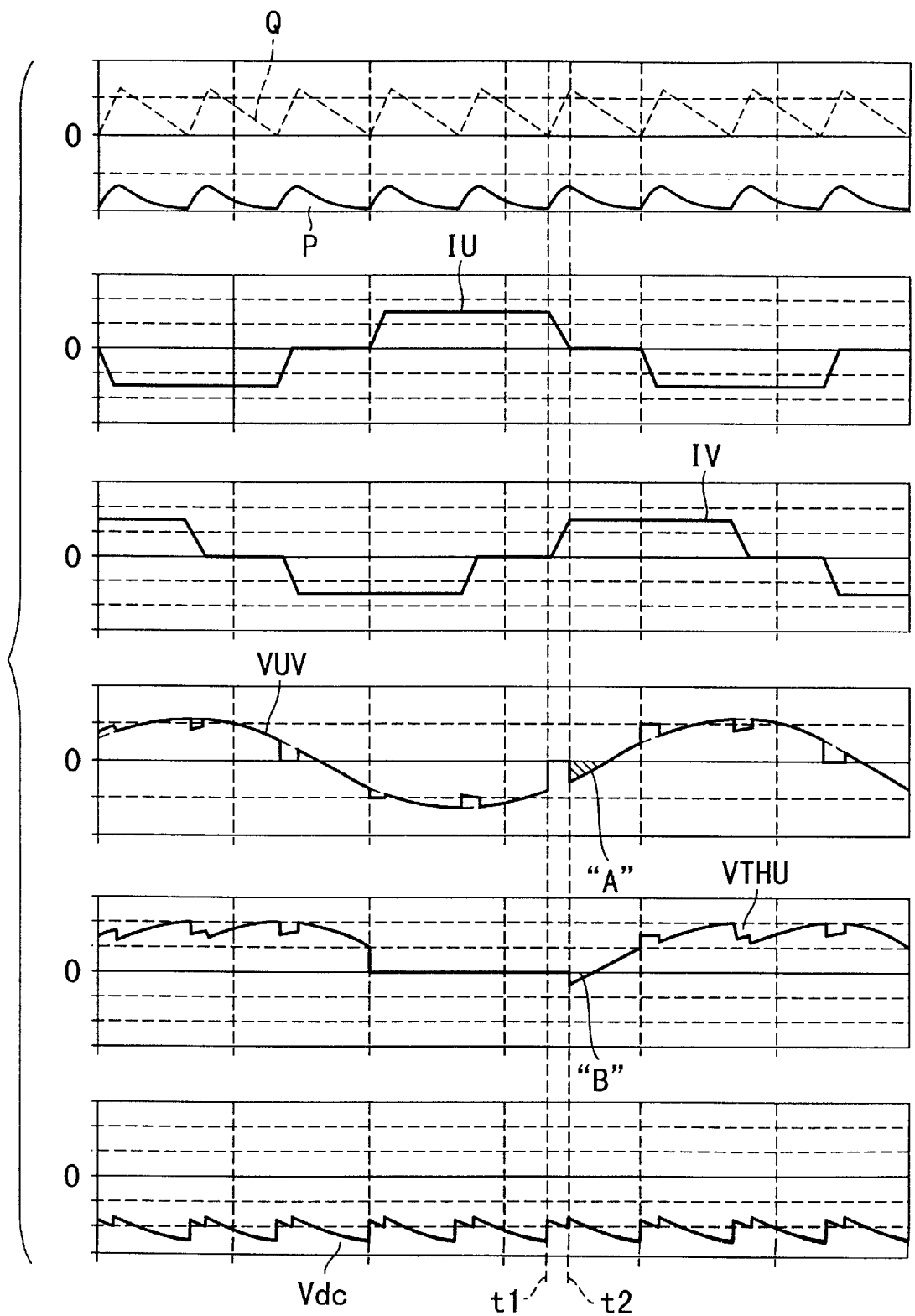
FIG. 4 is a waveform diagram for use in explanation of the operation of the power converter of FIG. 3.

A comparison between the conventional reactive power shown in FIG. 4 and the reactive power in the present embodiment shown in FIG. 13 reveals that the power converter can be operated without generating any reactive power.

Figure 3:
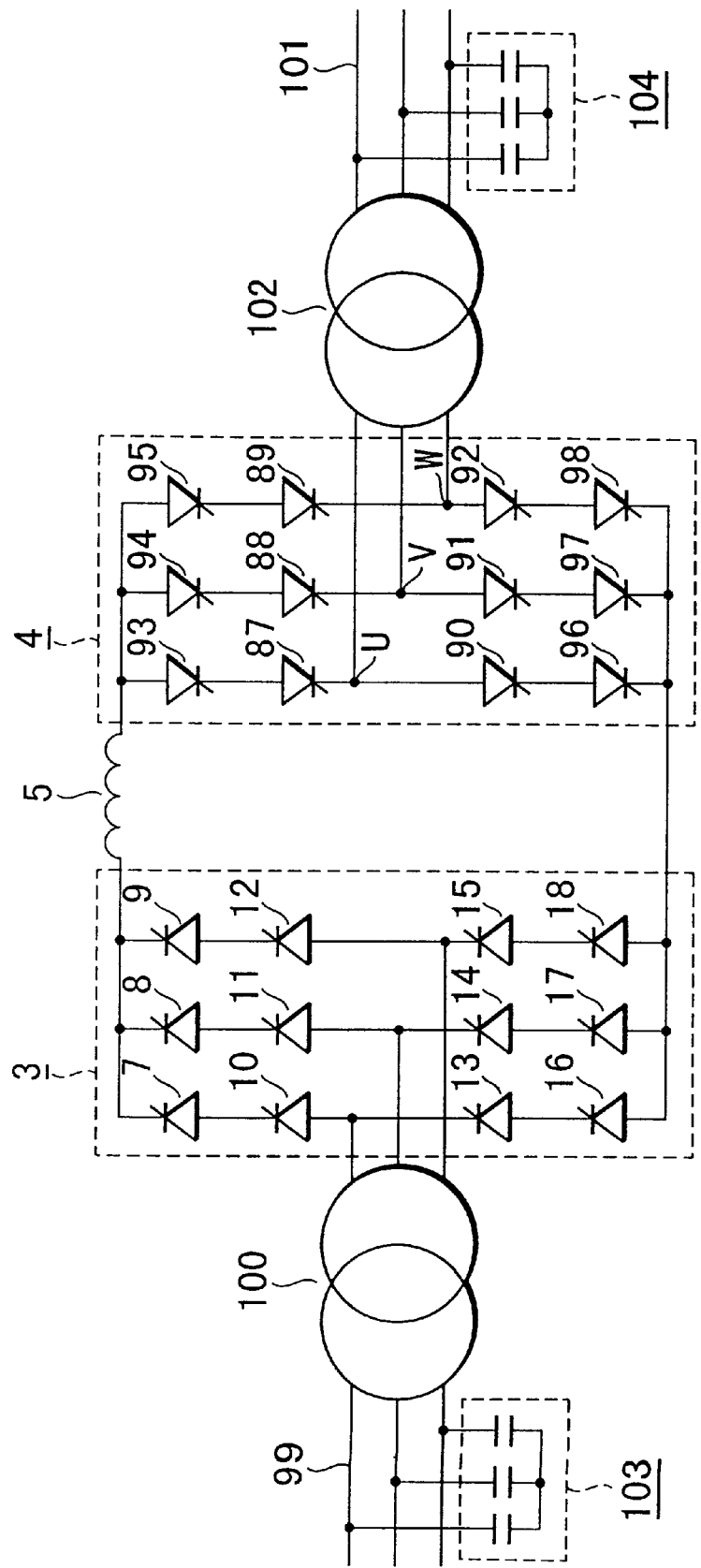
FIG. 3 shows an arrangement of another conventional power converter.

Thus, the need of the leading capacitors 103 and 104 of large capacitance described in the conventional technique shown in FIG. 3 and attendant large installation space for them can be eliminated. A comparison in active power P reveals that the power converter of this embodiment provides more power. Thus, the utilization of the power converter can be improved.

In addition, since only the self-excited converters 111 and 112 in which self-excited switch units are connected in bridge configuration have only to be added to the existing thyristor-based bridges that make up the converter 3-1 and the inverter 4-1, the need of redesign is eliminated. Thus, maintenance can be made very easy in comparison with the second embodiment.

[Modification of Third Embodiment]

In the power converter of this embodiment, a thyristor in the converter 3-1 and a self-excited switch unit in the self-excited converter 111 which are in corresponding arms of the same phase are commutated in the same phase. The output current of the converter 3-1 is controlled by causing the converter controller 67 to, on the basis of the phase of the first power supply 69 (the phase of a.c. voltage of the converter 3-1) detected by means not shown, in commutation from a thyristor in conduction to a thyristor to be conducted next, turn on simultaneously the self-excited switch unit in the arm to be conducted next in the self-excited converter 111 and the thyristor to be conducted next in the converter 3-1 at the phase at which a backward voltage is applied across the conducting thyristor and, at the same time, turn off the self-excited switch unit in the conducting arm when current in the conducting arm falls below a predetermined value.

In the inverter 4-1 and the self-excited converter 112 as well, a thyristor and a self-excited switch which are in corresponding arms of the same phase are commutated in the same phase. The output frequency of the inverter 4-1 is controlled by causing the inverter controller 68-1 to, on the basis of the phase of the second power supply 101 (the phase of a.c. voltage of the inverter) detected by means not shown, in commutation from a thyristor in conduction to a thyristor to be conducted next in the inverter, turn on simultaneously the arm to be conducted next in the self-excited converter 112 and the thyristor to be conducted next in the inverter 4-1 at the phase at which a backward voltage is applied across the conducting thyristor and, at the same time, turn off the self-excited switch unit in the conducting arm when current in the conducting arm falls below a predetermined value.

The power converter thus arranged provides the same advantages as the power converter of the third embodiment by, in commutation from a thyristor in conduction to a thyristor to be conducted next in the converter, turning on simultaneously the next arm in the self-excited converter 111 and the next thyristor in the converter at the phase at which a backward voltage is applied across the conducting thyristor and, at the same time, turning off the self-excited switch unit in the conducting arm when current in the conducting arm falls below a predetermined value.

In addition, as described in connection with FIG. 13, the power converter can turn off the GTOs of the U phase at time t4 at which the U-phase current has fallen to a certain value, i.e., reduce their switching loss at off time. Thus, current when the GTOs are turning off can be reduced, i.e., their switching loss can be reduced. The same holds for the other phases. Thus, the efficiency of the power converter can be improved.

[Fourth Embodiment]

Figure 14:
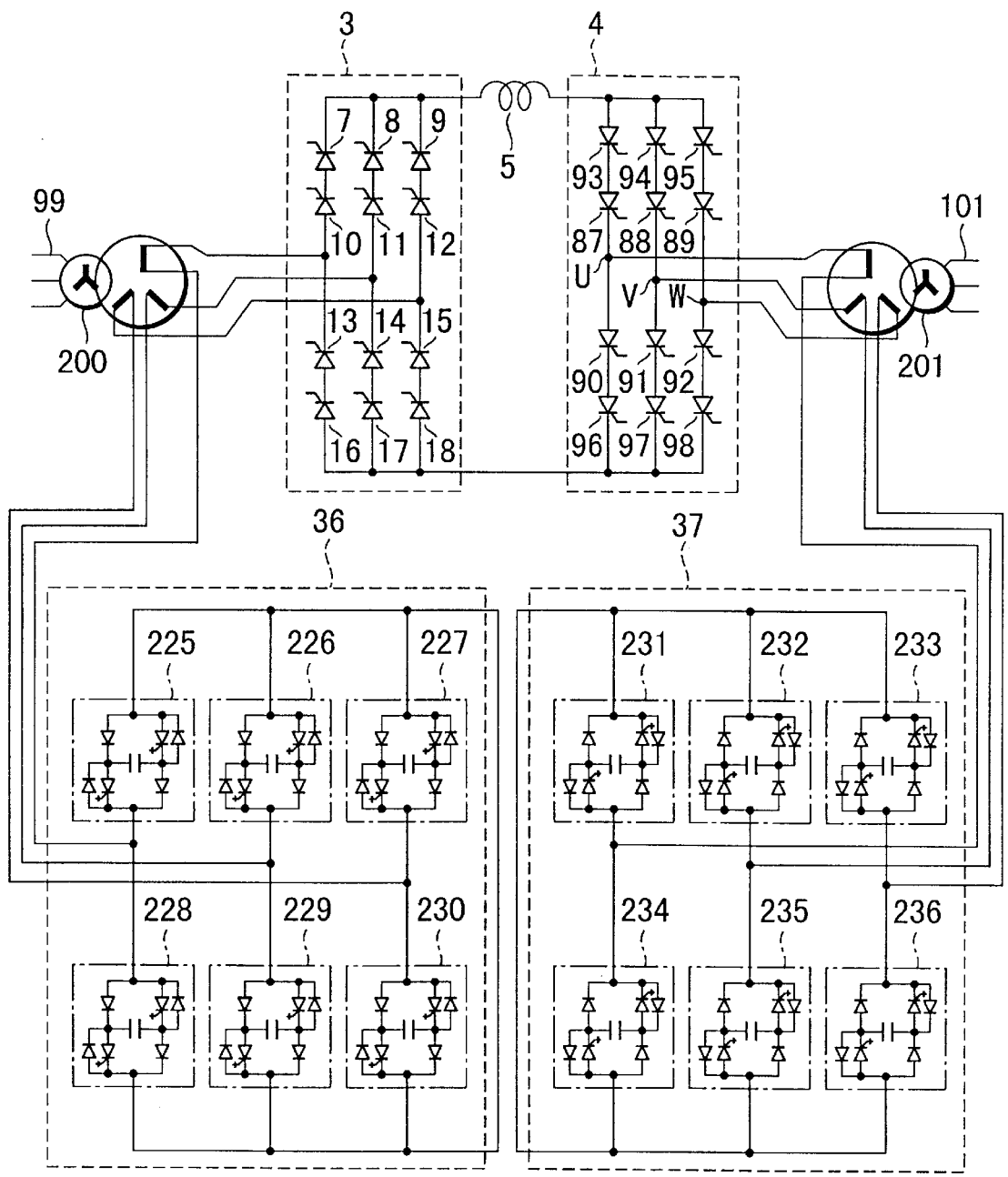
FIG. 14 shows a circuit arrangement of a power converter according to a fourth embodiment of the present invention.

FIG. 14 shows an arrangement of a power converter according to a fourth embodiment of the present invention. In this figure, like reference numerals are used to denote corresponding components to those in FIG. 12.

In the power converter of this embodiment, the first single-phase transformers 105, 106 and 107 and a the second single-phase transformers 108, 109 and 110 in FIG. 12 are replaced by a first transformer 200 and a second transformer 201.

Each of the a.c. three-phase terminals of the self-excited converter 111 is connected to a terminal of a corresponding one of neutral-point-separated secondary windings of the first transformer 200 in Y—Y connection. Each of the a.c. three-phase terminals of the converter 3-1 and the inverter 4-1 is connected to the other terminal of a corresponding one of the secondary windings of the first transformer 200.

That is, the ends of the U-phase secondary winding of the first transformer 200 are connected to the U phase of the converter 3-1 and the U phase of the self-excited converter 111. The same holds for V and W phases. In the same manner, the inverter 4-1 and the self-excited converter 112 are connected to the second transformer 201.

Reference numerals 225, 226, 227, 228, 229 and 230 denote self-excited switch units of U, V, W, X, Y and Z phase that make up the self-excited converter 111 and reference numerals 231, 232, 233, 234, 235 and 236 denote self-excited switch units of U, V, W, X, Y and Z phase that make up the self-excited converter 112.

The self-excited converter 111 of FIG. 7 is arranged identically to the self-excited converter 111 of FIG. 5. As an example, the self-excited switch unit 225 of FIG. 7 is the same as the unit of FIG. 12 which is composed of GTOs 119 and 120, diodes 143, 132, 144, and 131, and capacitor 155. The same holds for the other self-excited switch units 226, 227, 228, 229, and 230.

The self-excited converter 112 of FIG. 14 is arranged identically to the self-excited converter 112 of FIG. 12. As an example, the self-excited switch unit 231 of FIG. 7 is the same as the unit of FIG. 12 which is composed of GTOs 219 and 220, diodes 243, 232, 244, and 231, and capacitor 255. The same holds for the other self-excited switch units 226, 227, 228, 229, and 230.

The power converter of the fourth embodiment thus arranged provides the same advantages as with the third embodiment.

[Modification of Fourth Embodiment]

In the power converter of this embodiment, a thyristor in the converter 3-1 and a self-excited switch unit in the self-excited converter 111 which are in corresponding arms of the same phase are commutated in the same phase. The output current of the converter 3-1 is controlled by causing the converter controller 67 to, on the basis of the phase of the first power supply 99 (the phase of a.c. voltage of the converter 3-1) detected by means not shown, in commutation from a thyristor in conduction to a thyristor to be conducted next, turn on simultaneously the self-excited switch unit in the arm to be conducted next in the self-excited converter 111 and the thyristor to be conducted next in the converter 3-1 at the phase at which a backward voltage is applied across the conducting thyristor and, at the same time, turn off the self-excited switch unit in the conducting arm when current in the conducting arm falls below a predetermined value.

In the inverter 4-1 and the self-excited converter 112 as well, a thyristor and a self-excited switch which are in corresponding arms of the same phase are commutated in the same phase. The output frequency of the inverter 4-1 is controlled by causing the inverter controller 68 to, on the basis of the phase of the second power supply 101 (the phase of a.c. voltage of the inverter) detected by means not shown, in commutation from a thyristor in conduction to a thyristor to be conducted next in the inverter, turn on simultaneously the arm to be conducted next in the self-excited converter 112 and the thyristor to be conducted next in the inverter 4-1 at the phase at which a backward voltage is applied across the conducting thyristor and, at the same time, turn off the self-excited switch unit in the conducting arm when current in the conducting arm falls below a predetermined value.

The power converter thus arranged provides the same advantages as the power converter of the fourth embodiment by, in commutation from a thyristor in conduction to a thyristor to be conducted next in the converter, turning on simultaneously the next arm in the self-excited converter 111 and the next thyristor in the converter at the phase at which a backward voltage is applied across the conducting thyristor and, at the same time, turning off the self-excited switch unit in the conducting arm when current in the conducting arm falls below a predetermined value.

In addition, as described in connection with FIG. 6, the power converter can turn off the U-phase GTOs at time t4 at which the U-phase current has fallen to a certain value, i.e., reduce their switching loss at off time. Thus, current when the GTOs are turning off can be reduced, i.e., their switching loss can be reduced. The same holds for the other phases. Thus, the efficiency of the power converter can be improved.

As described above, the power converter of the present invention can reduce torque ripple generated when driving a synchronous motor.

In addition, the power converter of the present invention can reduce reactive power generated when supplying general electric power. Thus, an economical power converter can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power converter comprising first and second power conversion units that are connected to each other by a d.c. reactor, wherein the first power conversion unit has arms consisting of thyristors connected in a bridge configuration, and the second power conversion unit comprises a thyristor-based conversion unit consisting of thyristors and a self-excited conversion unit having self-extinguishing semiconductor devices for producing a commutation voltage for the thyristor-based conversion unit, and the thyristors and the self-extinguishing semiconductor devices are connected in series to form arms, the arms being connected in a bridge configuration.

2. A power converter comprising first and second power conversion units that are connected to each other by a d.c. reactor, wherein at least one of the first and second power conversion units comprises a thyristor-based conversion unit and a self-excited conversion unit having self-extinguishing semiconductor devices for producing a commutation voltage for the thyristor-based conversion unit, the self-excited conversion unit comprises a plurality of self-excited switch units, and wherein each of the self-excited switch units comprises:
a first series combination of a first self-extinguishing semiconductor device and a first diode,
a second series combination of a second diode and a second self-extinguishing semiconductor device, the second series combination being connected in parallel with the first series combination, and
a capacitor connected between a connection point between the first diode and the first self-extinguishing semiconductor device and a connection point between the second diode and the second self-extinguishing semiconductor device.

3. A power converter comprising first and second power conversion units that are connected to each other by a d.c. reactor, wherein at least one of the first and second power conversion units comprises a thyristor-based conversion unit and a self-excited conversion unit having self-extinguishing semiconductor devices for producing a commutation voltage for the thyristor-based conversion unit, wherein the self-excited conversion unit comprises a plurality of self-excited switch units, and each of the self-excited switch units comprises:

a first series combination of a first self-extinguishing semiconductor device and a first diode, a second series combination of a second diode and a second self-extinguishing semiconductor device, the second series combination being connected in parallel with the first series combination, a capacitor connected between a connection point between the first diode and the first self-extinguishing semiconductor device and a connection point between the second diode and the second self-extinguishing semiconductor device, a third diode connected in antiparallel connection with the first self-extinguishing semiconductor device, and a fourth diode connected in antiparallel connection with the second self-extinguishing semiconductor device.

4. The power converter according to claim 3, wherein the first power conversion unit has converter control means for performing gate control to converter operate the first power conversion unit, and the second power conversion unit has inverter control means for performing gate control to inverter operate the second conversion unit.

5. The power converter according to claim 4, wherein the inverter control means comprises means for, on the basis of the phase of a.c. voltage of the first or second power conversion unit, in commutation from an arm in conduction to an arm to be conducted next, turning on simultaneously the self-excited conversion unit and the thyristor-based conversion unit in the arm to be conducted next at a time at which a backward voltage is applied across the conducting arm and, at the same time, turning off the self-excited conversion unit in the conducting arm.

6. A power converter comprising first and second power conversion units that are connected to each other by a d.c. reactor, wherein each of the first and second power conversion units comprises a thyristor-based conversion unit consisting of thyristors and a self-excited conversion unit having self-extinguishing semiconductor devices for producing a commutation voltage for the thyristor-based conversion unit, and the thyristors and the self-extinguishing semiconductor devices are connected in series to form arms, the arms being connected in a bridge configuration.

7. The power converter according to claim 6, wherein each of the first and second power conversion units has inverter control means for performing gate control to inverter operate each of the first and second conversion units.

8. The power converter according to claim 7, wherein the inverter control means comprises means for, on the basis of the phase of a.c. voltage of the first or second power conversion unit, in commutation from an arm in conduction to an arm to be conducted next, turning on simultaneously the self-excited conversion unit and the thyristor-based conversion unit in the arm to be conducted next at a time at which a backward voltage is applied across the conducting arm and, at the same time, turning off the self-excited conversion unit in the conducting arm.

9. The power converter according to claim 6, wherein the self-excited conversion unit comprises means for, on the basis of the phase of a.c. voltage of the first or second power conversion unit, in commutation from an arm in conduction to an arm to be conducted next, turning on simultaneously the self-excited conversion unit and the thyristor-based conversion unit in the arm to be conducted next at a time at which a backward voltage is applied across the conducting arm and, at the same time, turning off the self-excited conversion unit in the conducting arm.

10. A power converter comprising first and second power conversion units that are connected to each other by a d.c. reactor, wherein the first power conversion unit is connected with a first transformer, the second power conversion unit is connected with a second transformer, each of the first and second power conversion units comprises a thyristor-based conversion unit consisting of thyristors and a self-excited conversion unit having self-extinguishing semiconductor devices for producing a commutation voltage of the thyristor-based conversion unit, and the thyristors and the self-extinguishing semiconductor devices are connected in series to form arms, the arms being connected in a bridge configuration.

11. The power converter according to claim 10, wherein each of the first and second power conversion units has inverter control means for performing gate control to inverter operate each of the first and second conversion units.

12. The power converter according to claim 11, wherein the inverter control means comprises means for, on the basis of the phase of a.c. voltage of the first or second power conversion unit, in commutation from an arm in conduction to an arm to be conducted next, turning on simultaneously the self-excited conversion unit and the thyristor-based conversion unit in the arm to be conducted next at a time at which a backward voltage is applied across the conducting arm and, at the same time, turning off the self-excited conversion unit in the conducting arm.

13. The power converter according to claim 10, wherein each of the first and second transformers has a plurality of single-phase transformers, the primary windings of the single-phase transformers are connected in a star configuration, and the secondary windings of the single-phase transformers are connected at their one ends with a.c. terminals of the thyristor-based conversion unit and at their other ends with a.c. terminals of the self-excited conversion unit.

14. The power converter according to claim 10, wherein each of the first and second transformers has a multi-phase transformer having its primary winding connected in a star configuration and its secondary windings separated, and the secondary windings of the transformer are connected at their one ends with a.c. terminals of the thyristor-based conversion unit and at their other ends with a.c. terminals of the self-excited conversion unit.

* * * * *